US007757835B2

United States Patent
Garthaffner et al.

(10) Patent No.: US 7,757,835 B2
(45) Date of Patent: Jul. 20, 2010

(54) BEAD FEEDER

(75) Inventors: Travis M. Garthaffner, Midlothian, VA (US); Martin T. Garthaffner, Chesterfield, VA (US)

(73) Assignee: Philip Moris USA Inc., Richmond, VA (US)

( * ) Notice: Subject to any disclaimer, the term of this patent is extended or adjusted under 35 U.S.C. 154(b) by 70 days.

(21) Appl. No.: 12/277,705

(22) Filed: Nov. 25, 2008

(65) Prior Publication Data

US 2009/0145724 A1 Jun. 11, 2009

Related U.S. Application Data

(60) Provisional application No. 60/992,500, filed on Dec. 5, 2007.

(51) Int. Cl.
*B65G 29/00* (2006.01)
(52) U.S. Cl. .................. 198/392; 198/443; 221/265
(58) Field of Classification Search .......... 198/392, 198/443, 445, 389–390; 221/265
See application file for complete search history.

(56) References Cited

U.S. PATENT DOCUMENTS 3,722,740 A * 3/1973 List ..................... 221/7
3,817,423 A * 6/1974 McKnight ............. 198/392
3,942,645 A * 3/1976 Aronson ............... 209/545
4,150,766 A * 4/1979 Westendorf et al. ...... 221/112
4,673,077 A * 6/1987 Taniguchi ............. 198/393
5,826,696 A   10/1998 Rupp et al.
5,865,342 A    2/1999 Ito et al.
5,927,546 A * 7/1999 Yuyama et al. ......... 221/265
6,394,308 B1 * 5/2002 Yuyama et al. ......... 221/265

* cited by examiner

*Primary Examiner*—Mark A Deuble
(74) *Attorney, Agent, or Firm*—Connolly Bove Lodge & Hutz LLP

(57) ABSTRACT

A bead feeder for serially delivering beads to a downstream location comprises a bead supply wheel connected to rotate about a substantially vertical axis. The bead supply wheel includes a bead supply bowl and a plurality of radially and outwardly extending bead passageways connected to rotate with the bowl and dimensioned to receive a single line of beads from the bowl. A plurality of discharge openings in the bead supply bowl is spaced around a lower portion thereof with the openings in alignment with the radially and outwardly extending passageways, and each of the passageways has an outer exit end. A stationary blocking ring is directly below the outer exit ends of the passageways for receiving the lowermost bead from the single line of beads in each passageway. A drop-off on the blocking ring allows the lowermost beads to drop away in a downward direction while a stationary bead retainer above the drop-off of the blocking ring retained the bead adjacent the outermost bead.

9 Claims, 2 Drawing Sheets

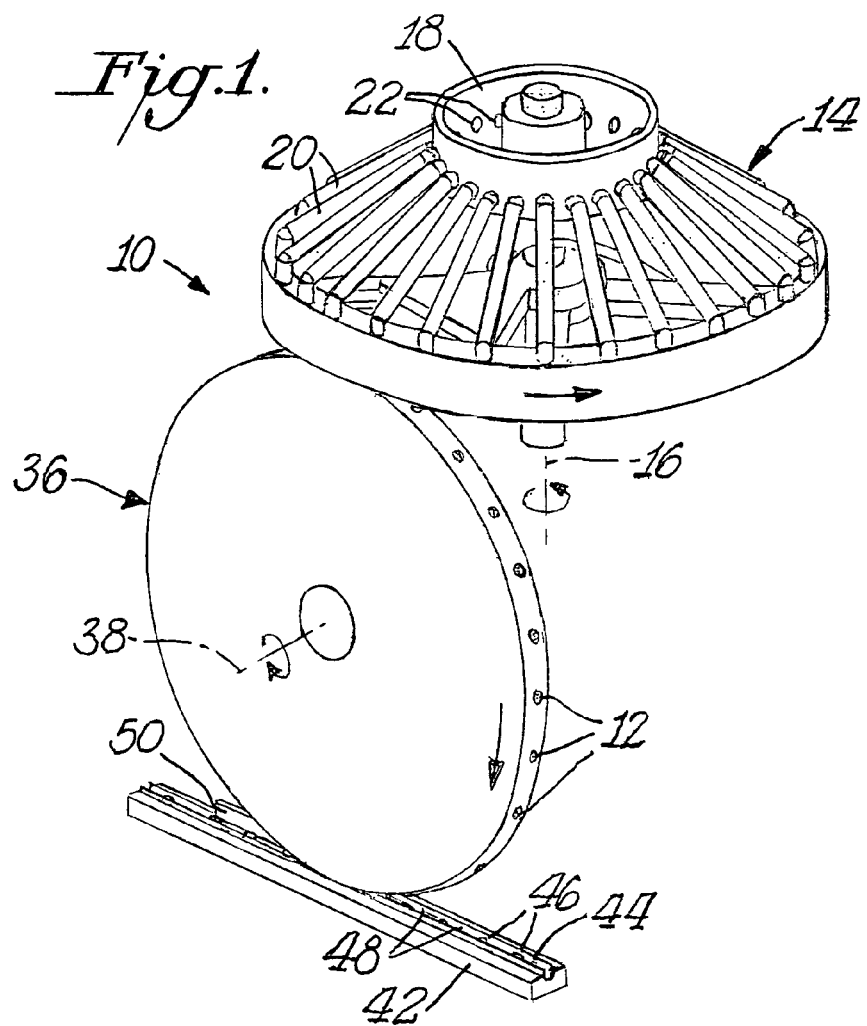
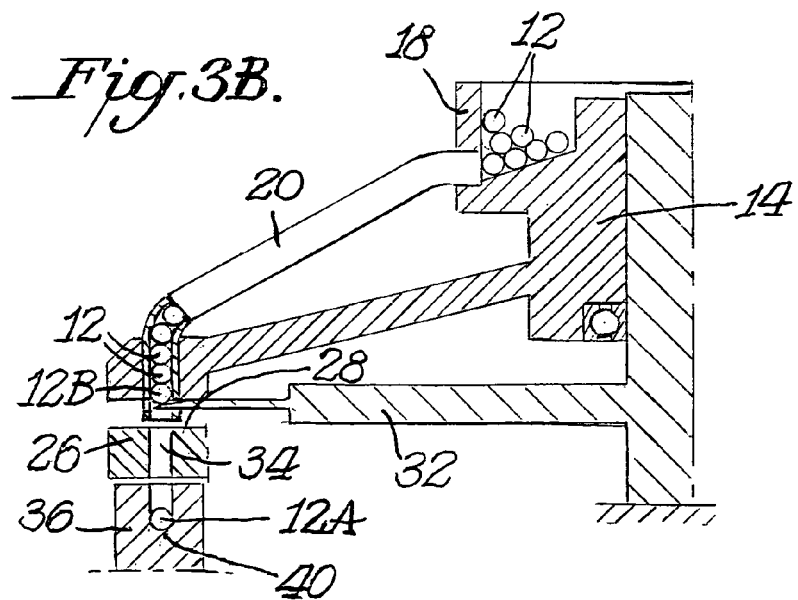

[//]: # (Page 1)

BEAD FEEDER

CROSS REFERENCE RELATED TO APPLICATION

The present application claims the benefit of provisional application Ser. No. 60/992,500, filed Dec. 5, 2007, for all useful purposes, and the specification and drawings thereof are included herein by reference.

BACKGROUND OF THE INVENTION

The present invention relates to bead feeder, and more particularly to a machine the feeds generally spherical beads from a bulk supply to a downstream location such as the interior space of a plug-space-plug cigarette filter during filter production.

A variety of cigarette filters have been proposed over the years, and many of these filters include granular filter materials particularly in so-called plug-space-plug filter arrangements. In these filter arrangements spaced apart plugs, usually made of cellulose acetate, define a cavity or space therebetween which is filled with granulated material, such as granulated carbon as well as other materials. For example, beaded material has also been proposed for introduction into the space of a plug-space-plug filter arrangement. The actual filing of the space may be in a horizontal manner and in other instances the filling operation is vertically oriented. Also, as an alternative to a charge of granules or beads, larger beads may be fed to the space between the cellulose acetate plugs, with one bead introduced into each space or cavity.

SUMMARY OF THE INVENTION

Accordingly, one of the objects of the present invention is a bead feeder that functions to serially delivery beads from a bulk supply to a downstream location in a highly efficient manner.

Another object of the present invention is a bead feeder that transports beads from a bulk supply to a space or cavity in a cigarette filter during filter production.

Still another object of the present invention is a bead feeder which operates at a high speed in a simple and trouble free manner.

In accordance with the present invention, a bead feeder comprises a bead supply wheel connected to rotate about a substantially vertical axis. The bead supply wheel includes a bead supply bowl that delivers beads to a plurality of radially arranged and outwardly extending transfer passageways connected to rotate with the bowl. The bowl includes a plurality of discharge openings spaced around a lower portion thereof and each opening is in alignment with one of radially and outwardly extending passageways. The passageways guide the beads one after another in a line in a downstream direction.

The bead feeder further includes a stationary blocking ring below the outer exit end of each of the radially and outwardly extending passageways for receiving the lowermost bead in each passageway. As the passageways rotate about the vertical axis, the lowermost bead rolls along the surface of the blocking ring. The stationary blocking ring includes a drop-off which allows the lowermost bead in each passageway to drop away from the blocking rings in a downward direction.

In order to prevent more than one bead from dropping away from the blocking ring, a stationary bead retainer is positioned above the drop-off of the blocking ring where it is arranged to slightly enter between the lowermost bead in each passageway and the adjacent bead in the line of beads delivered to the blocking ring. Once clear of the drop-off of the blocking ring, the adjacent bead is allowed to drop onto the blocking ring for subsequent removal when that bead later reaches the drop-off of the blocking ring.

A bead transfer wheel may be provided to receive the beads as they drop away from the blocking ring. The transfer wheel rotates on a horizontal axis, and spaced apart pockets on the outer circumference of the wheel receive the beads. Vacuum may be used to draw and hold the beads in the pockets until the beads are released from the wheel.

In one application on the present invention, a moving garniture is in alignment with and directly below the bead transfer wheel. The garniture transports filter paper with equally spaced apart plugs on the paper, and the downstream location to which the beads are delivered comprises the spaces or cavities between the plugs. The bead transfer wheel functions to deliver a single bead to each such cavity. A stationary stripper adjacent the bead transfer wheel functions to remove beads from the wheel.

BRIEF DESCRIPTION OF THE DRAWINGS

Novel features and advantages of the present invention in addition to those mentioned above will be readily apparent to persons of ordinary skill in the art from a reading of the following detailed description in conjunction with the accompanying drawings wherein similar reference characters refer to similar parts and in which:

FIG. 1 is a perspective view of a bead feeder, in accordance with the present invention;

FIG. 3B is a sectional view taken along line 3B-3B of FIG. 3; and

DETAILED DESCRIPTION OF THE INVENTION

Figure 2:
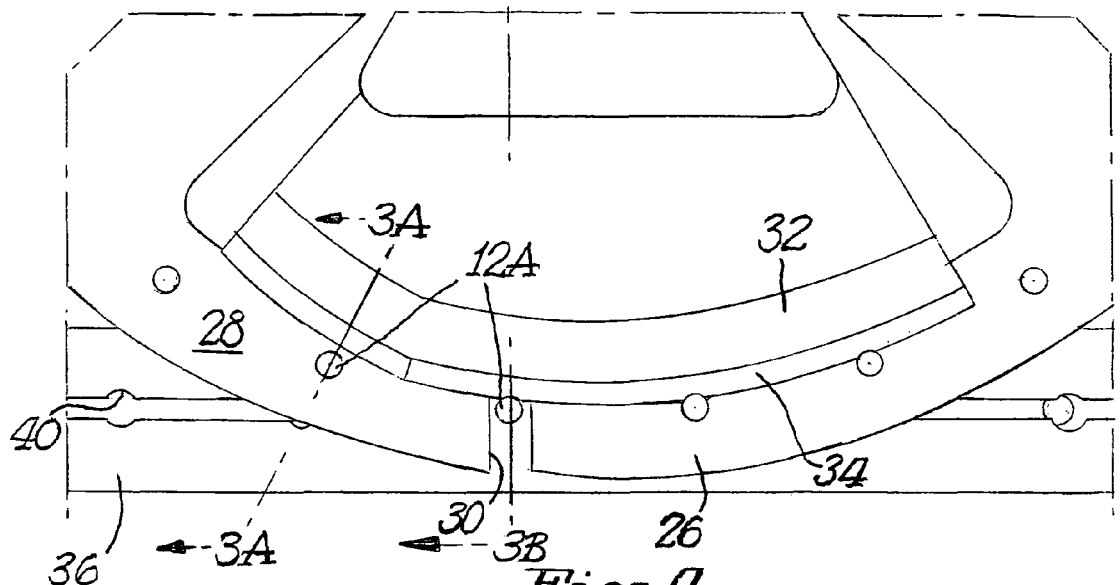
FIG. 2 is a partial top plan view of the bead feeder shown in FIG. 1 with portions thereof removed to show the lowermost bead of each passageway rolling along the stationary blocking and to show adjacent beads retained and thereby prevented from dropping from the drop-off of the blocking ring.
Figure 4:
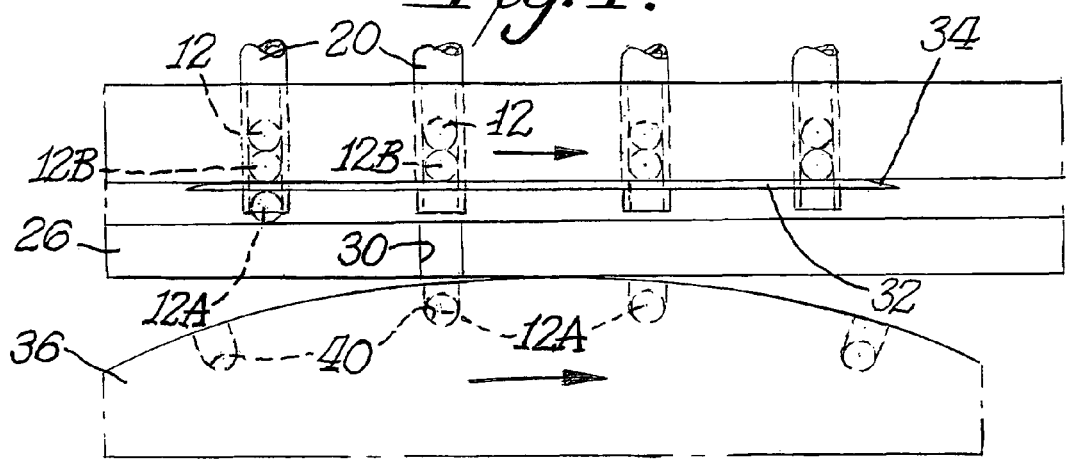
FIG. 4 is a partial front elevational view of the bead feeder of FIG. 1, illustrating the drop-off of each lowermost bead and the retention of the beads directly above.
Figure 3A:
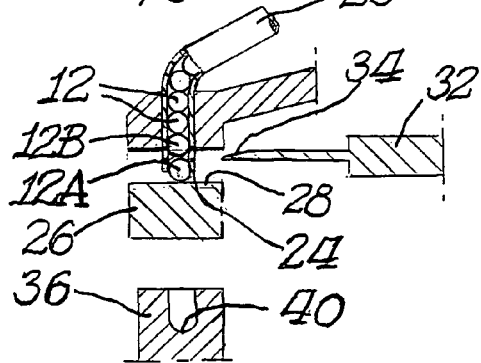
FIG. 3A is a sectional view taken along line 3A-3A of FIG. 2.

Referring in more particularity to the drawings, FIGS. 1-4 illustrate a bead feeder 10 for serially delivering beads 12 to a downstream location. As explained more fully below such downstream location may be the space or cavity between spaced apart cellulose acetate plugs in the production of so-called plug-space-plug cigarette filters. Throughout the detailed description the term bead is utilized which is intended to include spherical configurations as well as spherically ended components.

The bead feeder 10 of the present invention comprises a bead supply wheel 14 connected to rotate about a substantially vertical axis 16. The bead supply wheel includes a bead supply bowl 18 and a plurality of radially and outwardly extended tubes or bead passageways 20 connected to rotate with the bowl 18 and dimensioned to receive a single line of beads from the bowl. A plurality of discharge openings 22 in the bead supply bowl 18 are spaced around the lower portion of the bowl with the openings 22 in alignment with the radially and outwardly passageways 22. Each of the passageways 20 has an outer exit end 24.

A stationary blocking ring 26 is positioned directly blow the outer exit ends 24 of the passageway 20 for receiving a lowermost bead 12A from the single line of beads in each passageway. The lowermost beads 12A are retained by the passageway, but roll along the top surface 28 of the blocking ring as the passageway rotates about the vertical axis 16 relative to the stationary blocking ring.

The blocking ring includes a drop-off 30 which is constructed and arranged to allow the lowermost beads 12A rolling along the top surface of the blocking ring to drop away in a downward direction.

A stationary bead retainer 32 is positioned above the drop-off 30 of the blocking ring in order to retain the bead 12B adjacent the outermost bead 12A when the outermost bead reaches the drop-off 30. This allows the lowermost beads to drop away from the blocking ring while the other beads in the single line within the passageways 20 are retained.

The stationary bead retainer 22 may simply comprise a separator plate having an outer edge 34 that slightly enters between the lower most bead 12A on the blocking ring and the adjacent bead 12A of the single line of beads in each passageway. As shown best in FIG. 2, the outer edge of the retainer enters between the lowermost bead 12A and the adjacent bead 12B as the lowermost bead 12A approaches the drop-off 30. Subsequently, the adjacent bead 12B drops off of the bead retainer 32 onto the top surface 28 of the blocking ring 26. The adjacent bead becomes the lowermost bead in the passageways 20 and later drops away from the blocking ring through the drop-off 30 when its respective passageways reaches the drop-off.

The outer edge 32, 34 of the bead retainer 32 is horizontally oriented and parallel to the top surface 28 of the blocking ring 26. The distance between the outer edge of the bead retainer and the top surface 28 of the blocking ring 26 is approximately equal to the height or diameter of a single bead.

The bead feeder 10 also includes a bead transfer wheel 36 below the drop-off 30 of the blocking ring 26 connected to rotate about a substantially horizontal axis 38. The transfer wheel 36 includes equally spaced apart exterior pockets 40 on the circumferences of the wheel for receiving beads 12 from the drop-off 30 of the blocking ring 26.

Vacuum may be connected to selected pockets 40 to effect deposit of the beads into the pockets and ultimate removal from the bead transfer wheel.

In one application of the present invention a moving garniture 42 of a machine for producing cigarette filters is in alignment with and directly below the bead transfer wheel 36. The garniture 42 functions to transport filter paper 44 with equally spaced apart plugs 46 on the paper. Alternatively, the plugs 46 could be unevenly spaced apart, and in that case the delivery wheel pitch would be designed to synchronize with the cavities between the plugs. The plugs 44 may be made of cellulose acetate with appropriate binder, but other plug materials are equally acceptable depending upon the desired cigarette filter construction. The downstream location to which the beads 12 are delivered by the bead transfer wheel 36 of the bead feeder 10 comprise cavities or spaces 48 between the plugs 46. Ultimately after a bead is inserted into a cavity 48, the garniture functions to close the filter paper around the plugs and the beads, and after sealing the paper with adhesive along the longitudinal edges thereof the continuous filter composite is cut into individual plug-space-plug filters which are subsequently joined to wrapped tobacco rods.

A stationary stripper 50 may be positioned as shown in FIG. 1 adjacent the bead transfer wheel 18. The stripper is constructed and arranged to remove beads 12 from the pockets 40 of the bead transfer wheel 36. Additionally, the stripper may function to interrupt the vacuum supply to the pockets 40 to assist in removal of the beads from the pockets and discharge thereof into the cavities 48. A single bead is delivered to each of the cavities.

Any suitable drive mechanism may be utilized to rotate the bead supply wheel 14 and the bead transfer wheel 36. Also, the drive mechanism provides proper registration of the drop-off 30 of the blocking ring 26 and the bead receiving pockets 40 of the bead transfer wheel 36.

What is claimed is:

1. A bead feeder for serially delivering beads to a downstream location comprising:
    a bead supply wheel connected to rotate about a substantially vertical axis;
    the bead supply wheel including a bead supply bowl and a plurality of radially and outwardly extending bead passageways connected to rotate with the bowl and dimensioned to receive a single line of beads from the bowl;
    a plurality of discharge openings in the bead supply bowl spaced around a lower portion thereof with the openings in alignment with the radially and outwardly extending passageways;
    each of the passageways having an outer exit end;
    a stationary blocking ring directly below the outer exit ends of the passageways for receiving a lowermost bead from the single line of beads in each passageway;
    a drop-off on the blocking ring constructed and arranged to allow the lowermost beads on the blocking ring to drop away in a downward direction; and
    a stationary bead retainer above the drop-off of the blocking ring constructed and arranged to retain the bead adjacent the outermost bead when the lowermost bead reaches the drop-off.

2. A bead feeder as in claim 1 including a bead transfer wheel below the drop-off of the blocking ring connected to rotate about a substantially horizontal axis, the transfer wheel having spaced apart exterior pockets on circumferential portions thereof for receiving the beads from the drop-off of the blocking ring.

3. A bead feeder as in claim 2 including a moving garniture in alignment with and directly below the transfer wheel;
    the garniture transporting filter paper with equally spaced apart plugs on the paper; and
    wherein the downstream locations to which the beads are delivered comprise cavities between the plugs.

4. A bead feeder as in claim 3 wherein the transfer wheel is constructed and arranged to deliver a single bead to each cavity.

5. A bead feeder as in claim 2 including a stationary stripper adjacent the bead transfer wheel constructed and arranged to remove beads from the bead transfer wheel at the downstream location.

6. A bead feeder as in claim 1 wherein the stationary bead retainer includes an edge portion that slightly enters between the lowermost bead on the blocking ring and the adjacent bead of the single line of beads in each passageway.

7. A bead feeder as in claim 6 wherein the edge portion of the bead retainer is horizontally oriented and parallel to a top surface of the blocking ring, and wherein the distance between the edge portion of the retainer and the top surface of the blocking ring is approximately equal to a single bead height.

8. A method of serially delivering beads to a downstream location comprising:
    rotating a bead supply wheel about a substantially vertical axis;

the rotating step including rotating a bead supply bowl and a plurality of radially and outwardly extending bead passageways connected to rotate with the bowl;

delivering a single line of beads through a plurality of discharge openings in the bead supply bowl spaced around a lower portion thereof while maintaining the openings in alignment with the radially and outwardly extending bead passageways;

engaging the lowermost bead in each passageway onto a stationary blocking ring as the passageways rotate relative to the blocking ring; and dropping the lowermost beads on the blocking ring through a drop-off in the ring while simultaneously retaining the adjacent beads in the line wherein the passageways.

9. A method as in claim 8 further including the step of:

rotating a bead transfer wheel about a substantially horizontal axis constructed such that beads dropping from the blocking ring are received by the transfer wheel and serially delivered to the downstream location.

\* \* \* \* \*